Sept. 8, 1925.

T. STEIN

POWER INSTALLATION

Filed Aug. 15, 1922

1,553,119

Inventor:
Theodor Stein;
by His Attorney

Patented Sept. 8, 1925.

1,553,119

UNITED STATES PATENT OFFICE.

THEODOR STEIN, OF SCHONEICHE, GERMANY, ASSIGNOR TO GENERAL ELECTRIC COMPANY, A CORPORATION OF NEW YORK.

POWER INSTALLATION.

Application filed August 15, 1922. Serial No. 582,038.

*To all whom it may concern:*

Be it known that I, THEODOR STEIN, a citizen of the Swiss Republic, residing at Schoneiche, Germany, have invented certain new and useful Improvements in Power Installation, of which the following is a specification.

The present invention relates to power installations comprising a main condensing prime mover, such as a steam turbine, and a small non-condensing prime mover, such as a small steam turbine, which drives the auxiliaries for the main prime mover, and particularly to such installations wherein provision is made for extracting steam for industrial purposes.

The object of my invention is to provide an improved installation of this character which will give a high degree of efficiency under varying conditions of operation, the system being particularly well adapted for use where the demand for steam for industrial purposes is subject to great variation.

For a consideration of what I believe to be novel and my invention, attention is directed to the accompanying description and the claims appended thereto.

Figure 1:
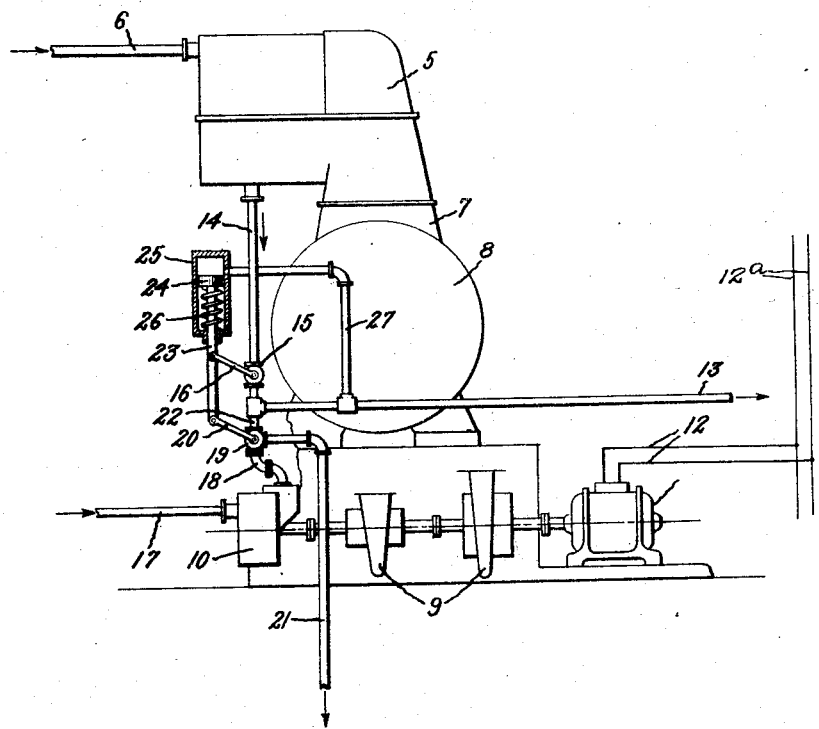
Figure 2:
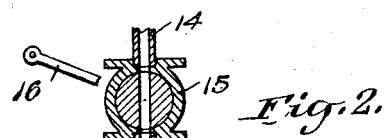

In the drawing, Fig. 1 is a diagrammatic view of an installation embodying my invention, and Fig. 2 is a detail sectional view taken from Fig. 1 on an enlarged scale, showing the inner structure and passages of certain parts thereof.

Referring to the drawing, 5 indicates a main prime mover having an admission conduit 6 and a discharge conduit 7, the latter being connected to a main condenser 8. The prime mover may be of any suitable type driving a load such as an electric generator and will be provided with the usual control valves, governors and the like as is well understood. Associated with the prime mover 5 are auxiliaries 9 such as circulating pumps, feed water pumps or the like, direct-connected to the shaft of a small non-condensing prime mover 10, here shown as a steam turbine. Direct-connected to the common shaft of auxiliaries 9 is an asynchronous dynamo-electric machine 11 having terminals 12 connected to a power line 12ª. Dynamo-electric machine 11 is adapted to run as a motor taking power from the line to drive or assist in driving the auxiliaries or it may run as a generator to supply power to the line. At 13 is a conduit which leads to one or more points where steam is consumed for industrial purposes. It is connected by a conduit 14 to a point of intermediate pressure in main turbine 5, and in conduit 14 is a valve 15 provided with an operating arm 16. When arm 16 is in the upper position as shown in the drawing, valve 15 is open so that elastic fluid may flow from the intermediate stage of turbine 5 through conduit 14 to extraction conduit 13. When arm 16 is moved downward, valve 15 is closed. Turbine 10 is provided with a supply conduit 17 which may contain suitable regulating valves (not shown) and with an exhaust conduit 18. In conduit 18 is a two-way valve 19 having an operating arm 20. When arm 20 is in the position shown in the drawing valve 19 connects conduit 18 to an exhaust pipe 21 leading to atmosphere or other point of lower pressure and when arm 20 is moved downward valve 19 is turned to disconnect conduit 18 from exhaust pipe 21 and connect conduit 18 by way of pipe 22 to extraction conduit 13. Valve 19 thus serves to connect exhaust conduit 18 either to a region of lower pressure or to extraction conduit 13.

Operating arms 16 and 20 are pivotally connected to the outer end of a stem 23 which at its inner end is connected to a piston 24 located in a cylinder 25. Surrounding stem 23 is a coiled spring 26 which at one end bears against piston 24 and at the other against a head of cylinder 25. Spring 26 acts in a direction to force the piston toward the top of cylinder 25 and thus hold valve 15 open and valve 19 in a position to connect conduit 18 to pipe 21. Connected to cylinder 25 above piston 24 is a pipe 27 which leads from extraction conduit 13. Pressure from conduit 13 thus acts on piston 24 in opposition to spring 26.

In operation, when the demand for steam for industrial purposes is great, the parts stand in the positions shown in the drawing, the steam being extracted from the main turbine 5. Turbine 10 then exhausts directly to atmosphere or other region of lower pressure through pipe 21. If it develops more power than that required to operate the auxiliaries, machine 11 will run as a generator absorbing the excess power and delivering it to the line. On the other hand, if turbine 10 does not provide sufficient power then machine 11 will run as a motor to help drive the load. Or, if desired, the arrangement may be such that motor 11 drives the major portion of the load, it being clear that any desired division of load between turbine 10 and motor 11 can be readily effected.

If now the demand for industrial steam falls off the pressure in conduit 13 will increase, thereby increasing the pressure on piston 24 and forcing it downward in cylinder 25. This reverses the positions of valves 15 and 19, valve 15 being closed and valve 19 being turned to disconnect conduit 18 from pipe 21 and connect it to conduit 13. The steam for industrial purposes then will be supplied by turbine 10. The power delivered by turbine 10 will be now governed by the demand for industrial steam. If this demand for industrial steam decreases to a point where the steam required is insufficient for turbine 10 to carry the auxiliary load, machine 11 will operate as a motor to carry the excess. On the other hand, if the demand for industrial steam increases to such an extent that turbine 10 delivers more power than that required by the auxiliary load, then the excess will be absorbed by machine 11 which will be driven as a generator to supply power to the line.

When the demand for industrial steam becomes so great that turbine 10 cannot supply it, the pressure in conduit 13 will decrease whereupon spring 26 will raise piston 24 to reverse the positions of valves 15 and 19 and again connect extraction conduit 13 to conduit 14 and conduit 18 to pipe 21.

The pressure in extraction line 13 varies with the demand for steam for industrial purposes and the pressure responsive device comprising cylinder 25 and piston 24 is so proportioned and arranged that valves 15 and 19 will be operated at the desired time to give the most economical operation of the installation as a whole, it having been found that when the demand for industrial steam is great the best economy is obtained by extracting it from an intermediate stage of the main turbine but that when the demand is light the best economy is obtained by utilizing exhaust steam from the auxiliary turbine.

As piston 24 moves from one extreme position to the other in response to the variations in pressure in extraction line 13, the valves 15 and 19 will be moved correspondingly as above pointed out and will, under certain conditions of pressure in extraction line 13, assume intermediate positions providing a connection between the extraction line 13 and conduits 14 and 18 and a connection between the conduit 18 and pipe 21. Under these conditions, the extraction line 13 will be supplied with steam from the intermediate point of the prime mover 5 and from turbine 10, with a portion of the exhaust steam from turbine 10 passing to the outlet pipe 21.

In accordance with the provisions of the patent statutes, I have described the principle of operation of my invention, together with the apparatus which I now consider to represent the best embodiment therefor, but I desire to have it understood that the apparatus shown is only illustrative and that the invention may be carried out by other means.

What I claim as new and desire to secure by Letters Patent of the United States, is:—

1. In combination, a main prime mover, a secondary prime mover, an extraction conduit, an exhaust pipe, and means for connecting the extraction conduit to an intermediate point in the main prime mover when the pressure in the extraction conduit is relatively low or to the exhaust end of the secondary prime mover when the pressure in the extraction conduit is relatively high, and for connecting the exhaust pipe to the exhaust end of the secondary prime mover when the extraction conduit is connected to the intermediate point in the main prime mover.

2. In combination, a main prime mover, a secondary prime mover, an extraction conduit, an exhaust pipe, and means controlled and moved by the pressure in the extraction conduit for connecting the extraction conduit to an intermediate point in the main prime mover when the pressure in the extraction conduit is relatively low or to the exhaust end of the secondary prime mover when the pressure in the extraction conduit is relatively high, and for connecting the exhaust pipe to the exhaust end of the secondary prime mover when the extraction conduit is connected to the intermediate point in the main prime mover.

3. In combination, a main prime mover, a secondary prime mover which drives an auxiliary load, an asynchronous motor connected to drive the auxiliary load, an extraction conduit, an exhaust pipe for the secondary prime mover, and means for connecting the extraction conduit to an intermediate point in the main prime mover when the pressure in the extraction conduit is relatively low or to the exhaust end of the secondary prime mover when the pressure in the extraction conduit is relatively high, and for connecting the exhaust pipe to the exhaust end of the secondary prime mover when the extraction conduit is connected to the intermediate point in the main prime mover, said asynchronous motor acting in conjunction with the secondary prime mover to either assist it in driving the auxiliary load or to run as a generator and absorb power from it.

4. In combination, a main prime mover, a secondary prime mover which drives an auxiliary load, an asynchronous motor connected to drive the auxiliary load, an extraction conduit, an exhaust pipe for the secondary prime mover, and means controlled and moved by the pressure in the extraction conduit for connecting the extraction conduit to an intermediate point in the main prime mover when the pressure in the extraction conduit is relatively low or to the exhaust end of the secondary prime mover when the pressure in the extraction conduit is relatively high, and for connecting the exhaust pipe to the exhaust end of the secondary prime mover when the extraction conduit is connected to the intermediate point in the main prime mover, said asynchronous motor acting in conjunction with the secondary prime mover to either assist it in driving the auxiliary load or to run as a generator and absorb power from it.

5. In a power installation, the combination of a main elastic-fluid turbine, a secondary elastic-fluid turbine, an exhaust conduit connected with said last-named turbine, an extraction conduit, a conduit connection between said extraction conduit and the main turbine at a point of intermediate pressure, a valve in said conduit connection, said valve being movable between an open and a closed position to control said connection, a conduit connection between the extraction conduit and the exhaust conduit of the secondary turbine, a two-way valve in such latter connection, and an exhaust pipe connected with said two-way valve, said two-way valve being movable simultaneously with the first-named valve to connect the exhaust conduit with the extraction conduit when said first-named valve is moved to the closed position and to connect the exhaust conduit with the exhaust pipe when said first-named valve is moved to the open position.

6. In a power installation, the combination of a main elastic-fluid turbine, a secondary elastic-fluid turbine, an exhaust conduit connected with said last-named turbine, an extraction conduit, a conduit connection between said extraction conduit and the main turbine at a point of intermediate pressure, a valve in said conduit connection, said valve being movable between an open and a closed position to control said connection, a conduit connection between the extraction conduit and the exhaust conduit of the secondary turbine, a two-way valve in such latter connection, an exhaust pipe connected with said two-way valve, said two-way valve being movable simultaneously with the first-named valve to connect the exhaust conduit with the extraction conduit when said first-named valve is moved to the closed position and to connect the exhaust conduit with the exhaust pipe when said first-named valve is moved to the open position, and means controlled and moved by the pressure in the extraction conduit for operating said valves.

In witness whereof, I have hereunto set my hand this 31st day of July, 1922.

THEODOR STEIN.